(12) United States Patent
Nam et al.

(10) Patent No.: US 11,024,266 B2
(45) Date of Patent: Jun. 1, 2021

(54) METHOD FOR MAINTAINING PERFORMANCE OF AN APPLICATION AND ELECTRONIC DEVICE THEREOF

(71) Applicant: SAMSUNG ELECTRONICS CO., LTD., Suwon-si (KR)

(72) Inventors: Jung Nam, Suwon-si (KR); Jungeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/750,387

(22) Filed: Jan. 23, 2020

(65) Prior Publication Data
US 2020/0234679 A1    Jul. 23, 2020

(30) Foreign Application Priority Data

Jan. 23, 2019  (KR) ........................ 10-2019-0008745

(51) Int. Cl.
G09G 5/391      (2006.01)
H04N 7/01       (2006.01)
H04N 21/4402    (2011.01)

(52) U.S. Cl.
CPC ........... *G09G 5/391* (2013.01); *H04N 7/0127* (2013.01); *H04N 21/440281* (2013.01); *G09G 2320/103* (2013.01); *G09G 2320/106* (2013.01); *G09G 2340/0435* (2013.01)

(58) Field of Classification Search
CPC ......... H04N 7/0127; H04N 21/440281; G09G 5/391; G09G 2320/103; G09G 2320/106; G09G 2340/0435

USPC ........................................................ 345/501
See application file for complete search history.

(56) References Cited

U.S. PATENT DOCUMENTS

| 9,804,661 | B2 | 10/2017 | Chae et al. | |
| 10,186,009 | B2 | 1/2019 | Kang et al. | |
| 2011/0157181 | A1* | 6/2011 | Diard | G09G 5/393 345/428 |
| 2012/0317266 | A1* | 12/2012 | Abbott | G06Q 30/0278 709/224 |
| 2014/0317427 | A1* | 10/2014 | Hill | G06F 1/324 713/322 |

(Continued)

FOREIGN PATENT DOCUMENTS

| KR | 10-2015-0070512 | 6/2015 |
| KR | 10-2015-0121845 | 10/2015 |

(Continued)

OTHER PUBLICATIONS

International Search Report and Written Opinion dated May 19, 2020 issued in International Application No. PCT/KR2020/001224.

*Primary Examiner* — Jacinta M Crawford
(74) *Attorney, Agent, or Firm* — Nixon & Vanderhye P.C.

(57) ABSTRACT

A display control method and an electronic device thereof according to various embodiments include a display, a processor operatively connected with the display, and a memory operatively connected with the processor, and the memory stores instructions that, when executed, cause the processor to execute an application, to detect performance degradation of the application, and to adjust a resolution of the application based on a resolution adjustment cost of the application in response to the performance degradation of the application being detected.

20 Claims, 12 Drawing Sheets

(56) References Cited

U.S. PATENT DOCUMENTS

| | | | |
|---|---|---|---|
| 2015/0042641 A1* | 2/2015 | Schluessler | G06T 15/005 |
| | | | 345/419 |
| 2015/0074462 A1 | 3/2015 | Jacoby | |
| 2016/0358537 A1 | 12/2016 | Kang | |
| 2017/0105055 A1 | 4/2017 | Lee et al. | |
| 2018/0033406 A1 | 2/2018 | Park et al. | |
| 2018/0095522 A1* | 4/2018 | Huang | G06F 9/5061 |
| 2018/0197508 A1 | 7/2018 | Chae et al. | |
| 2019/0362466 A1* | 11/2019 | Marchya | G06T 1/20 |
| 2019/0391898 A1* | 12/2019 | Vichare | G06F 11/3051 |

FOREIGN PATENT DOCUMENTS

| | | |
|---|---|---|
| KR | 10-2016-0142052 | 12/2016 |
| KR | 10-2017-0019615 | 2/2017 |

\* cited by examiner

METHOD FOR MAINTAINING PERFORMANCE OF AN APPLICATION AND ELECTRONIC DEVICE THEREOF

CROSS-REFERENCE TO RELATED APPLICATION

This application is based on and claims priority under 35 U.S.C. § 119 to Korean Patent Application No. 10-2019-0008745, filed on Jan. 23, 2019, in the Korean Intellectual Property Office, the disclosure of which is incorporated by reference herein in its entirety.

BACKGROUND

Field

The disclosure relates to a method for controlling a display in an electronic device and an electronic device thereof.

Description of Related Art

With the rapid development of hardware and/or software, a usage environment of a portable electronic device (for example, a smartphone or a tablet personal computer (PC)) is analogous to that of a PC. Such a portable electronic device may provide functions desired by a user through various applications such as a music application, a video application, or a digital broadcasting application. To achieve this, the portable electronic device may include a display to display contents provided by various applications.

Frames (frames per second (FPS)) of an application may change in real time due to various factors like performance of a portable electronic device and/or an amount of data processed in the application. When the change of the frames is great, a user of the portable electronic device may recognize the change of the frames of the application. Accordingly, user experience of the application may be degraded. In addition, when the frames are maintained less than or equal to a predetermined number, the user experience of the application may be degraded. Accordingly, there is a demand for a method for maintaining frames of an application within an appropriate range to prevent user experience of the application from being degraded.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide a method for maintaining frames of an application within an appropriate range when the application is executed, and an electronic device thereof An electronic device according to various example embodiments of the disclosure may include: a display; a processor operatively connected with the display; and a memory operatively connected with the processor, and the memory may be configured to store instructions that, when executed, cause the processor to execute an application, to detect performance degradation of the application, and to adjust a resolution of the application based on a resolution adjustment cost of the application in response to the performance degradation of the application being detected.

A method for controlling a display in an electronic device according to various example embodiments of the disclosure may include: executing an application; detecting performance degradation of the application; and adjusting a resolution of the application based on a resolution adjustment cost of the application in response to the performance degradation of the application being detected.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
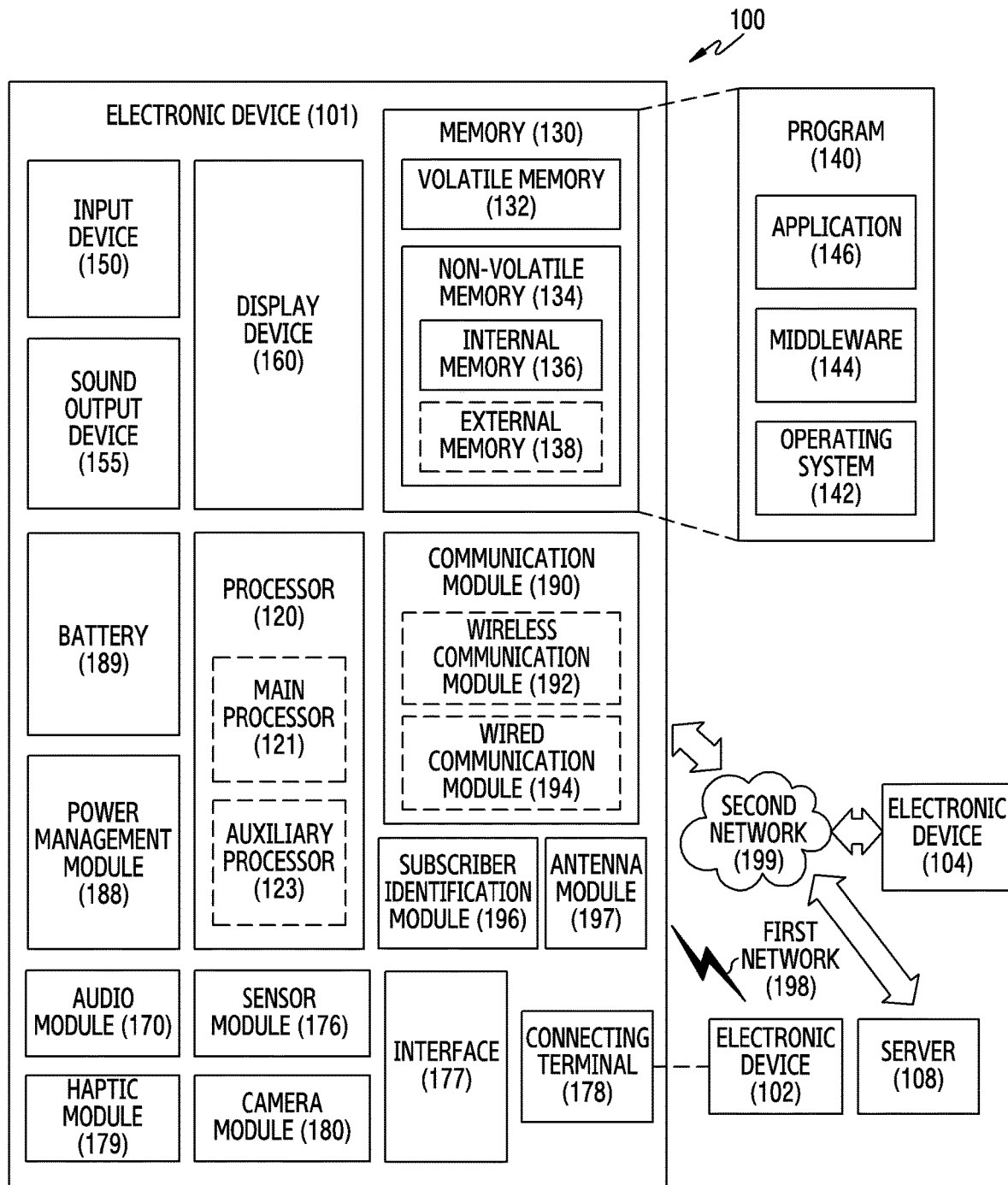
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
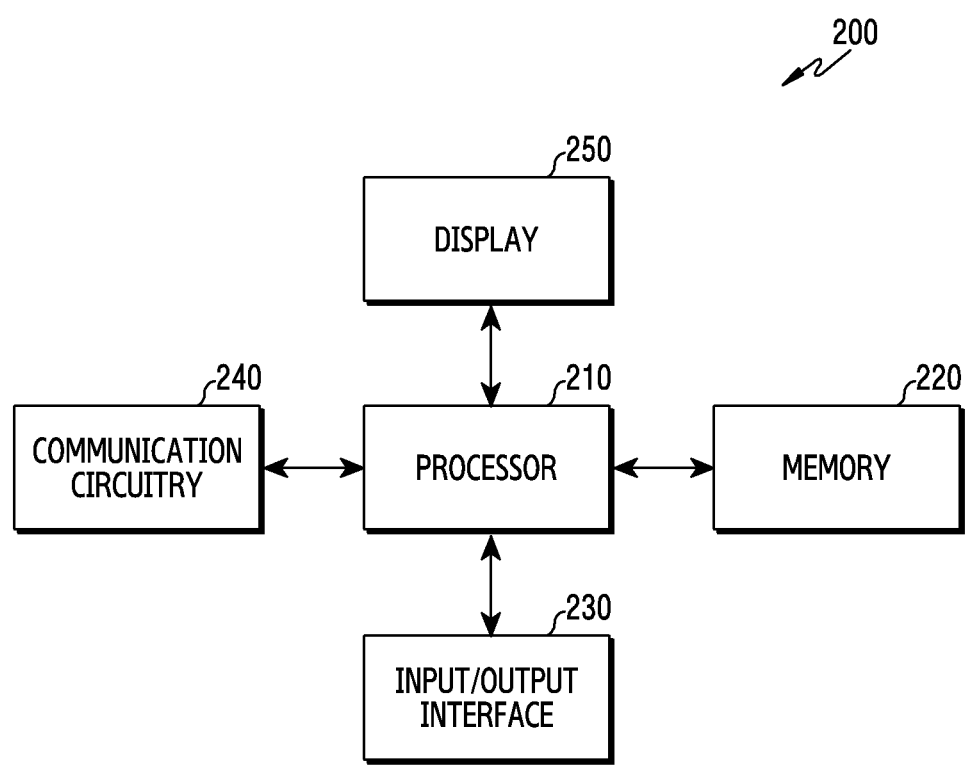
FIG. 2 is a block diagram illustrating an example electronic device according to various embodiments.

FIG. 2 is a block diagram illustrating an example electronic device according to various embodiments.

Referring to FIG. 2, an electronic device 200 (for example, the electronic device 101 of FIG. 1) may include a processor (e.g., including processing circuitry) 210 (for example, the processor 120 of FIG. 1), a memory 220 (for example, the memory 130 of FIG. 1), an input/output interface (e.g., including input/output circuitry) 230, and communication circuitry 240 (for example, the communication module 190 of FIG. 1). However, this should not be considered as limiting. For example, the electronic device 200 may further include a sensor module (for example, the sensor module 176 of FIG. 1) to obtain information related to a state (for example, temperature) of the electronic device 200.

According to various embodiments, the processor 210 may include various processing circuitry and drive an operating system (OS) or an application to control a plurality of hardware or software elements connected to the processor 210, and may process and compute a variety of data. According to an embodiment, the processor 210 may be implemented with a system on chip (SoC). According to an embodiment, the processor may further include a graphic processing unit (GPU) and/or an image signal processor (ISP). The processor 210 may load and process a command or data, which is received from at least one of the other elements, at the memory 220, and may store various data at the memory 220.

According to various embodiments, the processor 210 may determine whether performance of an application is degraded by monitoring the electronic device while the application is executed. For example, the processor 210 may monitor frames (FPS) of the application while the application is executed, and may determine whether the performance of the electronic device is degraded based on a change of the frames. In another example, the processor 210 may monitor a clock (or temperature) of the processor 210 while the application is executed, and may determine whether the performance of the application is degraded, based on a change of the clock (or temperature).

According to various embodiments, when it is detected that the performance of the application is degraded while the application is executed, the processor 210 may enhance the performance of the application by adjusting the clock or adjusting a resolution of the application. For example, when it is detected that the performance of the application is degraded, the processor 210 may compare a clock adjustment cost of the processor 210 and a resolution adjustment cost of the application, and may adjust the clock of the processor 210 or may adjust the resolution of the application, based on a result of comparing. According to an embodiment, the processor 210 may adjust the resolution of the application, based on training data stored in the memory 220 or training data received from an external electronic device (for example, the server 108 of FIG. 1).

According to various embodiments, the processor 210 may generate training data to be used to adjust the resolution of the application, and may store the training data in the memory 220. For example, the processor 210 may generate training data including at least one piece of information of clock information of the processor, load information of the processor, resolution information of the application, temperature information of the electronic device 200, and frame information of the application, while the application is executed, and may store the generated training data in the memory 220. According to an embodiment, the training data may be generated differently according to each application, or may be generated regardless of applications. According to various embodiments, the processor 210 may transmit the training data on the application to an external electronic device (for example, the server 108 of FIG. 1) through the communication circuitry 240. According to various embodiments, the processor 210 may receive the training data on the application from the external electronic device through the communication circuitry 240.

According to various embodiments, when the frames of the application increase by a designated range or higher while the application is executed, the processor 210 may maintain the frames of the application within the designated range by adjusting the resolution of the application or the clock of the processor 210. For example, when the frames of the application increase by the designated range or higher, the processor 210 may maintain the frames of the application within the designated range by increasing the resolution of the application or reducing the clock of the processor 210.

Figure 3A:
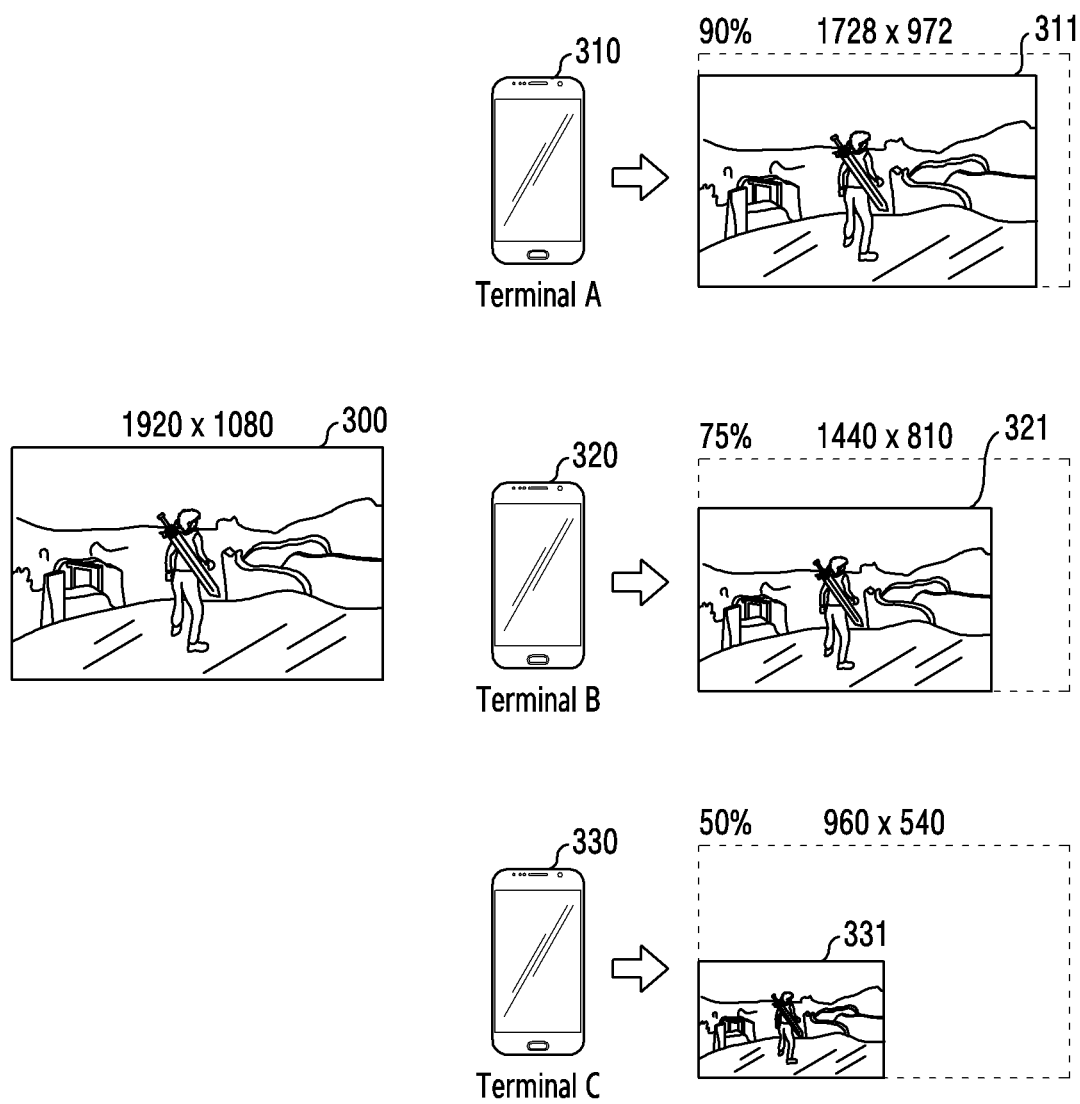
FIG. 3A is a diagram illustrating an example of a method of adjusting a resolution of an application in an electronic device according to various embodiments.
Figure 3B:
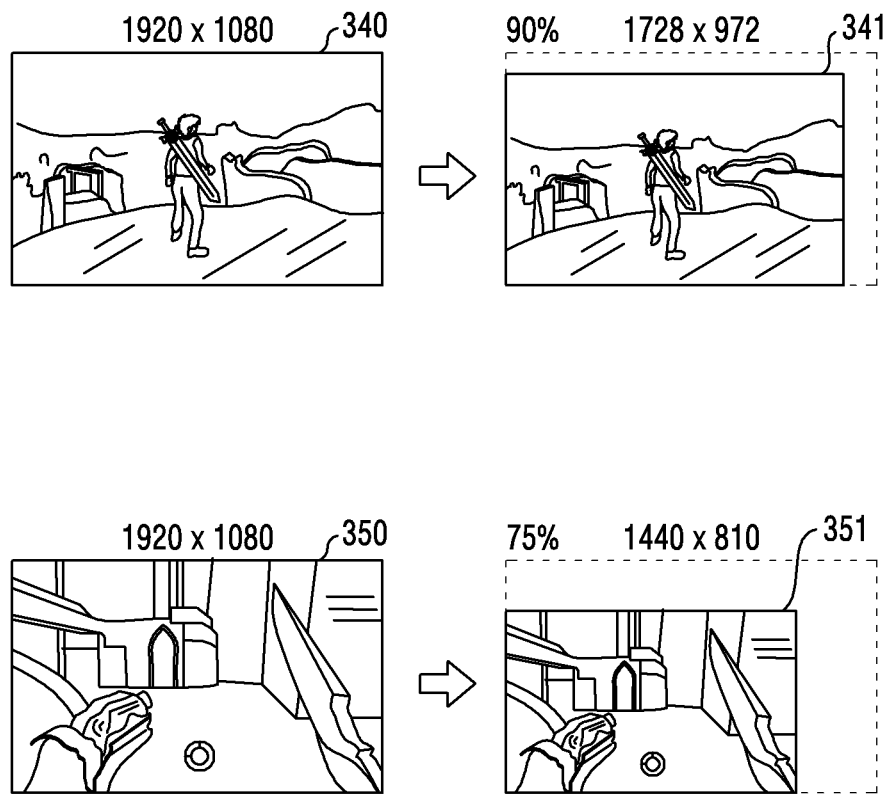
FIG. 3B is a diagram illustrating an example of the method of adjusting the resolution of the application in the electronic device according to various embodiments.

FIG. 3A is a diagram illustrating an example method of adjusting a resolution of an application in an electronic device according to various embodiments, and FIG. 3B is a diagram illustrating an example method of adjusting the resolution of the application in the electronic device according to various embodiments.

Referring to FIG. 3A, the application may support a screen 300 having a maximum resolution of 1920×1080. A terminal A 310 (for example, the electronic device 101 of FIG. 1 or the electronic device 200 of FIG. 2), a terminal B 320 (for example, the electronic device 101 of FIG. 1 or the electronic device 200 of FIG. 2), and a terminal C 330 (for example, the electronic device 101 of FIG. 1 or the electronic device 200 of FIG. 2) may be electronic device having different specifications.

According to various embodiments, the terminal A 310, the terminal B 320, and the terminal C 330 may have different processing capabilities regarding the same application because of their different specifications. For example, when the terminal A 310 provides a screen 311 which results from adjustment of the resolution of the application to 90% of the maximum resolution, the terminal A 310 may maintain the frames of the application more than or equal to target frames. When the terminal B 320 provides a screen 321 which results from adjustment of the resolution of the application to 75% of the maximum resolution, the terminal B 320 may maintain the frames of the application more than or equal to the target frames. When the terminal C 330 provides a screen 331 which results from adjustment of the resolution of the application to 50% of the maximum resolution, the terminal C 330 may maintain the frames of the application more than or equal to the target frames. The target frames refer to minimum frames that should be guaranteed for each application, and may be set to a different value according to each application.

As described above, the electronic devices may have different optimum resolutions regarding an application according to the specifications of the electronic devices even when the same application is executed. The electronic device may generate training data to determine an optimum resolution of the application, based on information of the electronic device (for example, clock information of the processor, load information of the processor, resolution information of the application, information regarding power consumption, temperature information, and/or frame information of the application), while the application is executed, and may change the resolution of the application based on the generated training data. As described above, the electronic device may generate the training data on the application by itself, and determine and change the optimum resolution of the application, such that enhanced experience can be provided to the user.

Referring to FIG. 3B, a first application may provide a screen 340 having a maximum resolution of 1920×1080, and a second application may provide a screen 350 having a maximum resolution of 1920×1080.

According to various embodiments, a hardware specification of the first application required when the first application is driven or data throughput of the first application may be lower than that of the second application. Accordingly, when a screen 341 which results from adjustment of the resolution of the first application to 90% of the maximum resolution is provided, the electronic device (for example, the electronic device 101 of FIG. 1 or the electronic device 200 of FIG. 2) may maintain frames of the first application more than or equal to target frames, and, when a screen 351 which results from adjustment of the resolution of the second application to 75% of the maximum resolution is provided, the electronic device may maintain frames of the second application more than or equal to target frames.

As described above, the electronic device may have a different optimum resolution according to a hardware specification or data throughput required by each application. The electronic device may generate training data to determine an optimum resolution of each application, based on information of the electronic device (for example, clock information of the processor, load information of the processor, resolution information of the application, information regarding power consumption, temperature information, and/or frame information of the application), while the application is executed, and may change the resolution of the application, based on the generated training data. As described above, the electronic device may generate the training data on the application by itself, and determine and change the optimum resolution of each application, such that enhanced experience can be provided to the user.

Figure 4:
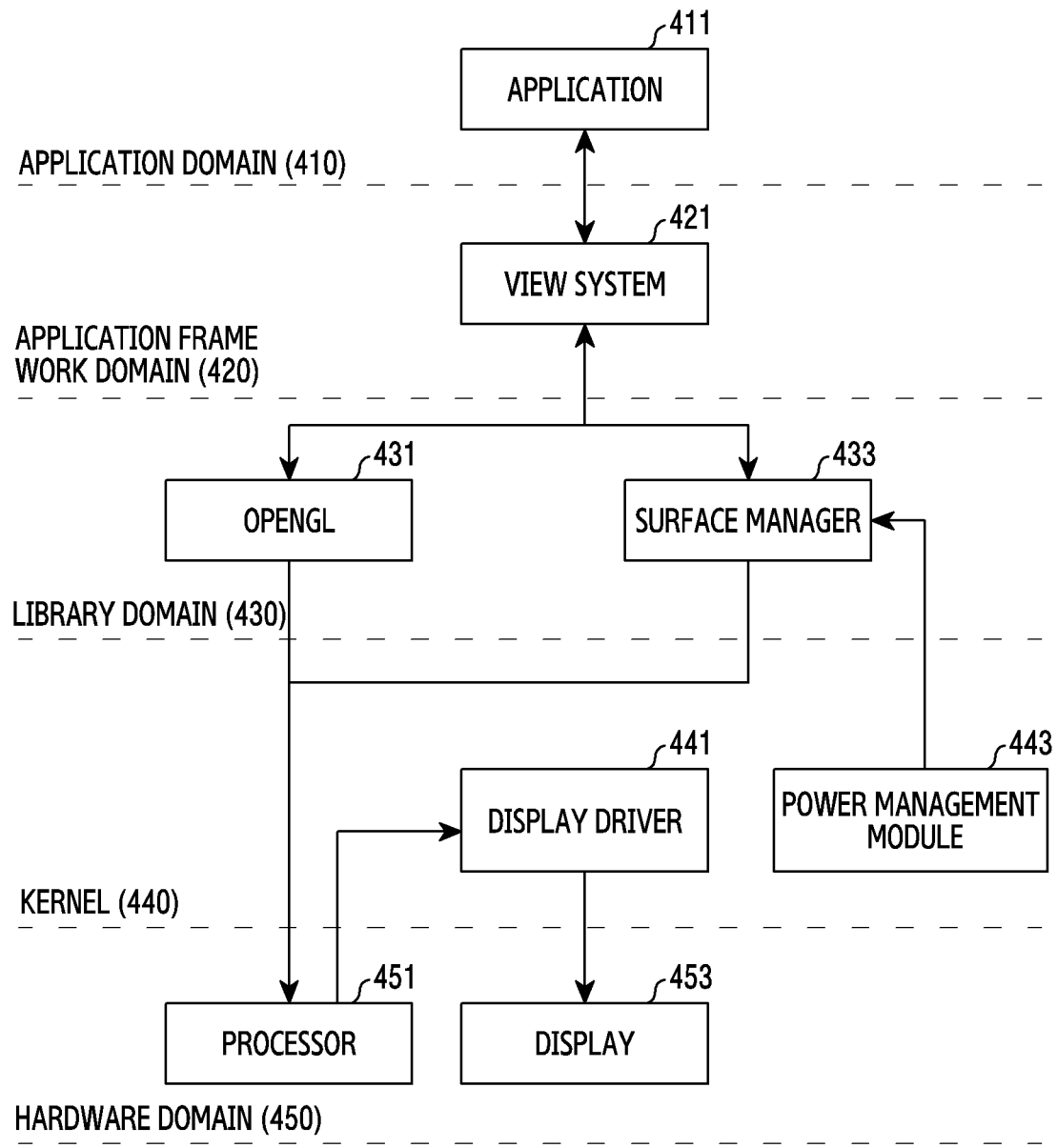
FIG. 4 is a diagram illustrating a view hierarchy of an electronic device according to various embodiments.

FIG. 4 is a diagram illustrating a view hierarchy of an electronic device according to various embodiments.

According to various embodiments, the view hierarchy of the electronic device (for example, the electronic device 101 of FIG. 1 or the electronic device 200 of FIG. 2) may include an application domain 410, an application frame work domain 420, a library domain 430, a kernel domain 440, and a hardware domain 450. According to an embodiment, the application domain 410 may include an application 411. According to an embodiment, the application frame work domain 420 may include a view system 421. According to an embodiment, the library domain 430 may include an openGL 431 and a surface manager 433. According to an embodiment, the kernel domain 440 may include a display driver 441 and a power management module 443. According to an embodiment, the hardware domain 450 may include a processor 451 (for example, the processor 120 of FIG. 1 or the processor 210 of FIG. 2), and a display 453 (for example, the display device 160 of FIG. 1 or the display 250 of FIG. 2).

According to various embodiments, when the application 411 of the application domain 410 is executed, the view system 421 of the application frame work domain 420 may be requested to configure a screen related to the application 411. The view system 421 may obtain data related to the configuration of the screen from the library domain 430, or may transmit the data to the library domain 430.

According to various embodiments, the application 411 may request the view system 421 to configure a screen. The view system 421 may request the openGL 431 and/or the surface manager 433 regarding the configuration of the screen according to the request of the application 411.

According to various embodiments, the openGL 431 of the library domain 430 may perform an operation of rendering an execution screen of the application 411.

According to various embodiments, the surface manager 433 may include a window manager, a SurfaceFlinger, and/or an activity manager. The surface manager 433 may generate a window and/or a surface of the application 411 according to the request of the view system 421. The surface manager 433 may generate image information by synthesizing the generated surfaces. According to various embodiments, the window manager may determine a resolution and may assign a frame buffer according to a virtual resolution, thereby rendering a content according to corresponding frames, and may increase a size according to a screen resolution using a hardware scaler.

According to various embodiments, the surface manager 433 may change the resolution of image information according to power information (for example, a current, a voltage, or power) provided to the power management module 443, and may transmit the changed resolution information to the processor 451.

According to various embodiments, the power management module 443 may provide information regarding power consumed in the electronic device to the processor 451, such that the resolution of the application is changed based on the power consumed in the electronic device.

According to various embodiments, when image information is generated in the library domain 430, the processor 451 of the hardware domain 450 may generate a screen to be displayed on the display 453 according to the image information, and the display driver 441 of the kernel domain 440 may assign a resource to the display 453 to display the generated screen on the display 453, and may transmit the generated screen.

According to various embodiments, at least a part of the surface manager 433 may be implemented using software, firmware, hardware, or a combination of two or more thereof. At least a part of the surface manager 433 may be implemented by the processor 451. At least a part of the surface manager 433 may include programs, routines, sets of instructions, or processes for performing one or more functions.

An electronic device (for example, the electronic device 101 of FIG. 1 or the electronic device 200 of FIG. 2) according to various example embodiments may include: a display (for example, the display device 160 of FIG. 1 or the display 250 of FIG. 2); a processor (for example, the processor 120 of FIG. 1 or the processor 201 of FIG. 2) operatively connected with the display; and a memory (for example, the memory 130 of FIG. 1 or the memory 220 of FIG. 2) operatively connected with the processor, and the memory may be configured to store instructions that, when executed, cause the processor to execute an application, to detect performance degradation of the application, and to adjust a resolution of the application based on a resolution adjustment cost of the application in response to the performance degradation of the application being detected.

According to various example embodiments, the instructions, when executed, may cause the processor to monitor frames (frames per second (FPS)) of the application while the application is executed, and to detect the performance degradation of the application based on a change in the frames of the application.

According to various embodiments, the electronic device may further include a temperature sensor (for example, the sensor module 176 of FIG. 1) configured to measure a temperature of at least a part of the electronic device, and the instructions, when executed, may cause the processor to obtain temperature information through the temperature sensor while the application is executed, and to detect the performance degradation of the application based on the temperature information.

According to various example embodiments, the instructions, when executed, may cause the processor to: identify training data corresponding to a current clock of the processor; determine the resolution adjustment cost of the application based on the training data corresponding to the target frames based on training data corresponding to target frames existing in the identified training data; and adjust the resolution of the application based on the training data corresponding to the target frames based on the resolution adjustment cost of the application being less than or equal to a first reference value.

According to various example embodiments, the instructions, when executed, may cause the processor to: based on the training data corresponding to the target frames not existing in the identified training data, determine the resolution adjustment cost of the application based on training data approximating to the target frames; and, based on the resolution adjustment cost of the application being less than or equal to the first reference value, adjust the resolution of the application based on the training data approximating to the target frames.

According to various example embodiments, the instructions, when executed, may cause the processor to: determine a penalty cost caused by reduction of the resolution based on a difference between a resolution of the training data and a current resolution of the application; determine a gain cost caused by the reduction of the resolution based on a difference between clock information of the processor of the training data and the current clock of the processor; and determine the resolution adjustment cost by adding the penalty cost and the gain cost.

According to various example embodiments, the instructions, when executed, may cause the processor to adjust a clock of the processor to maintain the frames of the application to be greater than or equal to the target frames based on the resolution adjustment cost of the application exceeding the first reference value.

According to various example embodiments, the instructions, when executed, may cause the processor to, based on it being identified that the frames of the application increase from previous frames by a designated range or higher while the application is executed, adjust the resolution of the application to make a difference between the frames of the application and the previous frames be within the designated range.

According to various example embodiments, the instructions, when executed, may cause the processor to: based on training data corresponding to the previous frames existing in the identified training data, determine the resolution adjustment cost of the application based on the training data corresponding to the previous frames; and, based on the resolution adjustment cost of the application exceeding a second reference value, adjust the resolution of the application based on the training data corresponding to the target frames.

According to various example embodiments, the instructions, when executed, may cause the processor to, based on the resolution adjustment cost of the application being less than or equal to the second reference value, adjust a clock of the processor to make a difference between the frames of the application and the previous frames be within the designated range.

Figure 5:
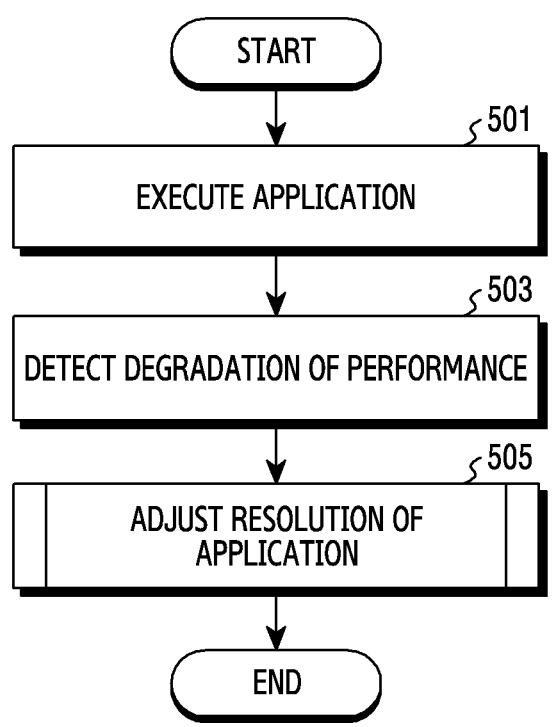
FIG. 5 is a flowchart illustrating an example method of controlling a display in an electronic device according to various embodiments.
Figure 6:
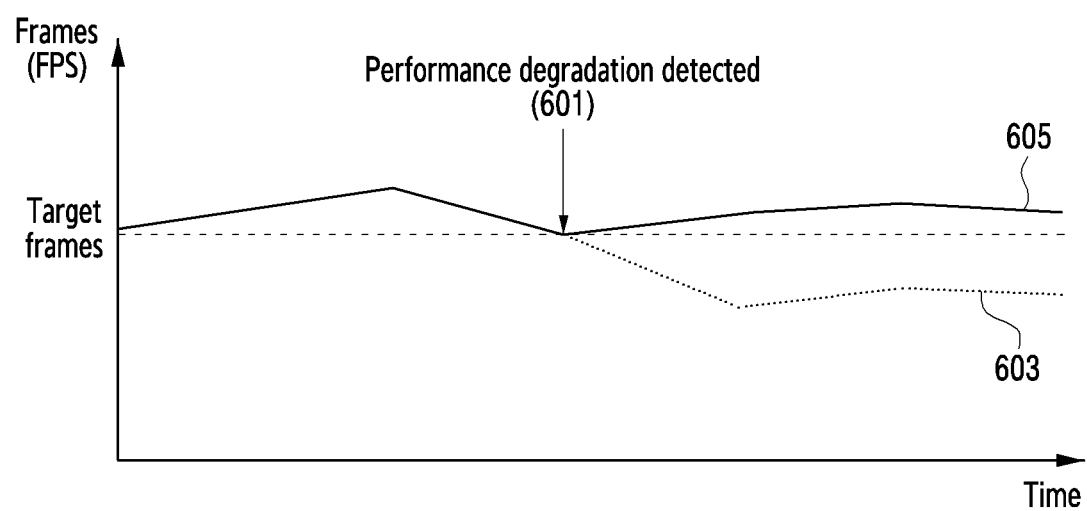
FIG. 6 is a graph illustrating an example of a change of frames of an application in an electronic device according to various embodiments.

FIG. 5 is a flowchart illustrating an example method of controlling a display in an electronic device according to various embodiments. FIG. 6 is a graph illustrating an example change of frames of an application in the electronic device according to various embodiments.

Referring to FIGS. 5 and 6, in operation 501, a processor (for example, the processor 120 of FIG. 1 or the processor 210 of FIG. 2) of the electronic device (for example, the electronic device 101 of FIG. 1 or the electronic device 200 of FIG. 2) may execute an application. For example, the processor may control a display (for example, the display device 160 of FIG. 1 or the display 250 of FIG. 2) to display an execution screen of the application based on a user input for executing the application. The application may include an application providing an image to a user, such as a game application or a movie application.

In operation 503, the processor may detect degradation of performance of the application while the application is executed. According to an embodiment, the processor may monitor frames (FPS) of the application while the application is executed, and may detect degradation of performance of the application based on a change of the frames of the application. For example, when frames 603 of the application are less than target frames, it may be determined that degradation of performance of the application is detected (601). The target frames may refer, for example, to minimum frames that should be guaranteed for each application to provide an adequate service, and may be set to a different value according to each application. According to an embodiment, the target frames may be information pre-set for the application. According to an embodiment, the target frames may be changed to another value based on a user input. According to an embodiment, the processor may obtain temperature information of the electronic device while the application is executed, and may detect degradation of the performance of the application based on the temperature information of the electronic device. For example, when temperature of the electronic device exceeds reference temperature, the processor may determine that degradation of the performance of the application is detected. The reference temperature may be changed based on a user input.

In operation 505, the processor may adjust a resolution of the application, based on a resolution adjustment cost of the application. For example, when the degradation of the performance of the application is detected, the processor may adjust the resolution of the application to make frames of the application more than or equal to the target frames, by considering a penalty (for example, degradation of user experience caused by reduction of the resolution) cost caused by the reduction of the resolution, and a gain cost (for example, a current, heating, or battery consumption) caused by the reduction of the resolution. For example, when a sum of the penalty cost caused by the reduction of the resolution and the gain cost caused by the reduction of the resolution is less than or equal to a first reference value, the processor may maintain frames 605 of the application to be more than or equal to the target frames as shown in FIG. 6, by adjusting the resolution of the application (for example, adjusting to a low resolution). According to an embodiment, when the sum of the penalty cost caused by the reduction of the resolution and the gain cost caused by the reduction of the resolution exceeds the first reference value, the processor may maintain the frames 605 of the application more than or equal to the target frames as shown in FIG. 6, by adjusting (for example, increasing) a clock of the processor.

According to various embodiments, when the frames of the application fall below the target frames, the electronic device may maintain the frames of the application to be more than or equal to the target frames, by adjusting the resolution of the application or adjusting the clock of the processor by considering the penalty cost caused by the reduction of the resolution and the gain cost (for example, a current, heating, or battery consumption) caused by the reduction of the resolution. Accordingly, the user of the electronic device can use the application more comfortably.

Figure 7:
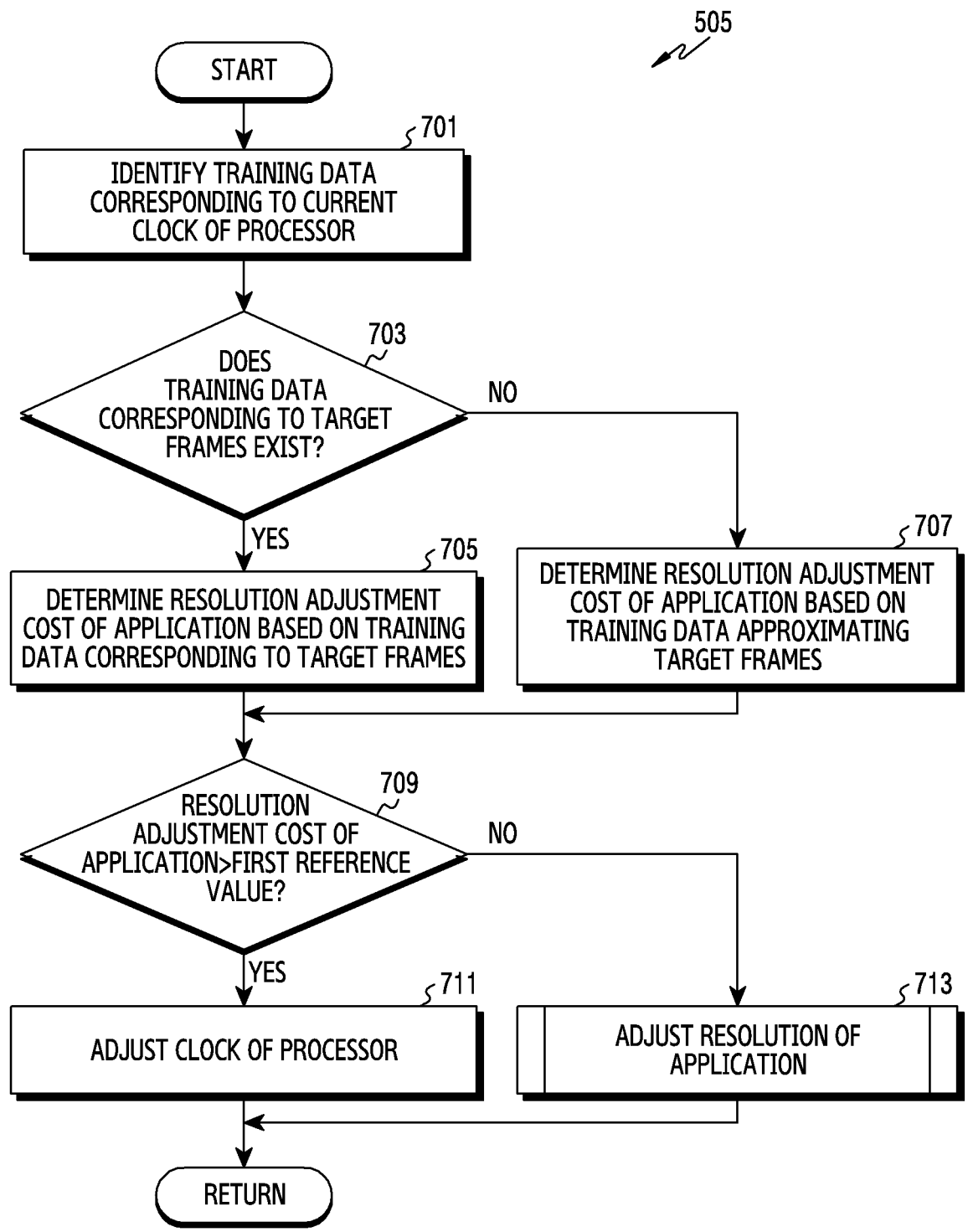
FIG. 7 is a flowchart illustrating an example method of adjusting a resolution of an application in an electronic device according to various embodiments.

FIG. 7 is a flowchart illustrating an example method of adjusting a resolution of an application in an electronic device according to various embodiments. The following description may describe detailed operations of operation 505 of adjusting the resolution of the application in FIG. 5.

Referring to FIG. 7, in operation 701, a processor (for example, the processor 120 of FIG. 1 or the processor 210 of FIG. 2) of the electronic device (for example, the electronic device 101 of FIG. 1 or the electronic device 200 of FIG. 2) may identify training data including the same clock information as a current clock of the processor from a memory (for example, the memory 130 of FIG. 1 or the memory 220 of FIG. 2), in response to degradation of performance of the application being detected while the application is executed.

In operation 703, the processor may determine whether training data corresponding to target frames exists in the training data corresponding to the current clock of the processor. For example, the processor may determine whether there exists training data including the same frame information as the target frames in the training data corresponding the current clock of the processor. When the training data including the same frame information as the target frames exists, the processor may perform operation 705, and, when the training data including the same frame information as the target frames does not exist, the processor may perform operation 707.

When the training data corresponding to the target frames exists, the processor may determine a resolution adjustment cost of the application, based on the training data corresponding to the target frames, in operation 705. The processor may determine a penalty cost caused by reduction of the resolution, by identifying a difference (or ratio) between a resolution of the application when the training data corresponding to the target frames is applied based on resolution information identified from the training data corresponding to the target frames, and a current resolution of the application. The processor may determine a gain cost (a current/heating/battery gain caused by reduction of the clock) caused by reduction of the resolution, by identifying a difference (or a ratio) between a clock of the processor when the training data corresponding to the target frames is applied based on clock information of the processor identified from the training data corresponding to the target frames, and a current clock of the processor. The processor may determine the resolution adjustment cost of the application by adding up the penalty cost caused by the reduction of the resolution and the gain cost caused by the reduction of the resolution.

When the training data corresponding to the target frames does not exist, the processor may determine a resolution adjustment cost of the application based on training data approximating the target frames in operation 707. The processor may determine a penalty cost caused by the reduction of the resolution, by identifying a difference (or a ratio) between a resolution of the application when the training data approximating to the target frame is applied based on resolution information identified from the training data approximating to the target frames, and a current resolution of the application. The processor may determine a gain cost (a current/heating/battery gain caused by reduction of the clock) caused by the reduction of the resolution, by identifying a difference (or a ratio) between a clock of the processor when the training data approximating to the target frame is applied based on clock information of the processor identified from the training data approximating to the target frames, and a current clock of the processor. The processor may determine the resolution adjustment cost of the application by adding up the penalty cost caused by the reduction of the resolution and the gain cost caused by the reduction of the resolution. According to an embodiment, when there are a plurality of training data closest approximating to the target frames, the processor may determine the resolution adjustment cost of the application based on training data which is more than or equal to the target frames.

In operation 709, the processor may determine whether the resolution adjustment cost of the application exceeds (e.g., is greater than) a first reference value. According to an embodiment, the first reference value may be set to a different value according to each application, or may be set to the same value regardless of applications. According to an embodiment, the first reference value may be set and changed by a user input or information received from a server (for example, the server 104 of FIG. 1). When the resolution adjustment cost of the application exceeds the first reference value, the processor may perform operation 711, and, when the resolution adjustment cost of the application is less than or equal to the first reference value, the processor may perform operation 713.

When the resolution adjustment cost of the application exceeds the first reference value, the processor may adjust the clock of the processor in operation 711. For example, the processor may increase the clock of the processor to maintain the frames of the application more than or equal to the target frames.

When the resolution adjustment cost is less than or equal to the first reference value, the processor may adjust the resolution of the application based on the training data approximating to the target frames or the training data corresponding to the target frames in operation 713. For example, the processor may adjust (for example, increase or reduce) a resolution of the training data based on a difference between frames of the training data approximating to the target frames and the target frames, and may adjust the resolution of the application based on the training data the resolution of which is adjusted. In another example, the processor may adjust the resolution of the application based on resolution information of training data including frame information corresponding to (the same as) the target frames.

According to various embodiments, the processor can provide performance of the application optimized in the electronic device to the user, by adjusting the resolution of the application using the training data trained based on hardware of the electronic device.

Figure 8:
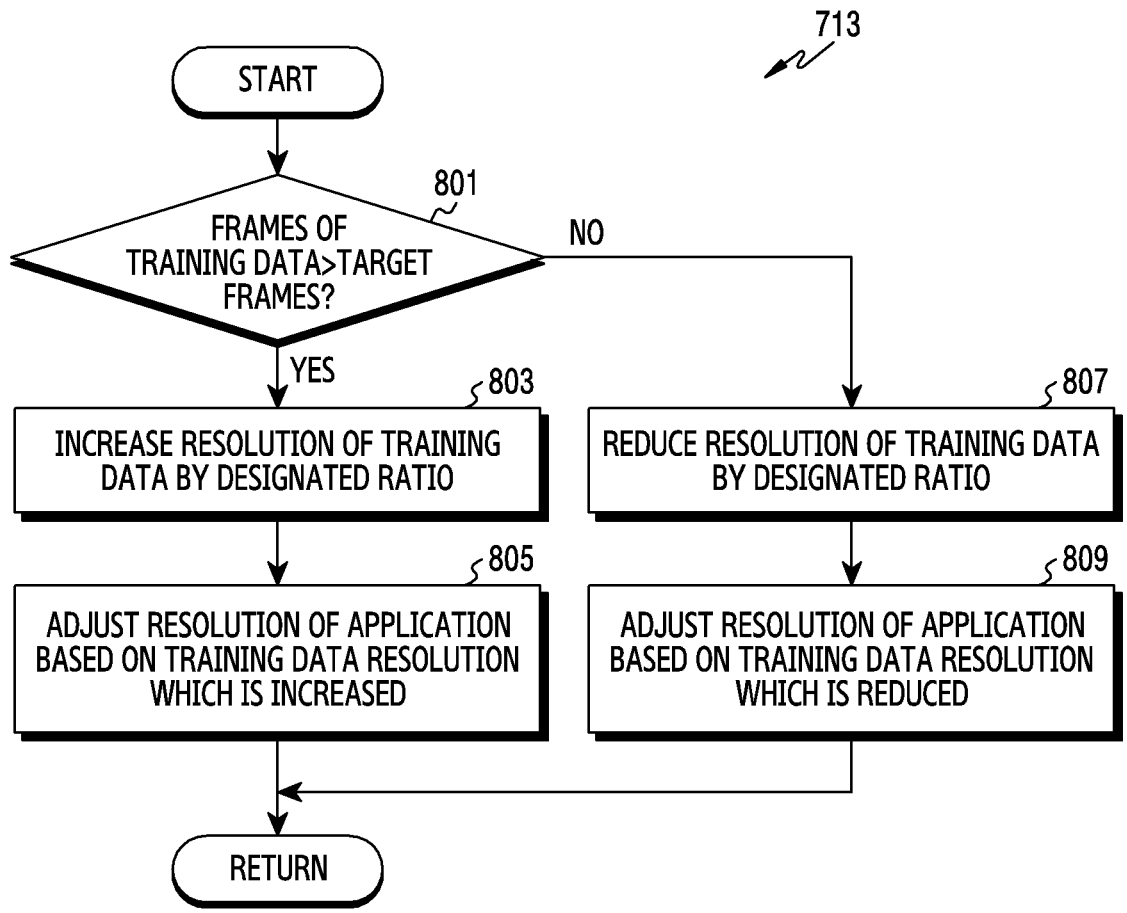
FIG. 8 is a flowchart illustrating an example method of adjusting a resolution of an application, based on training data approximating to target frames, in an electronic device according to various embodiments.

FIG. 8 is a flowchart illustrating an example method of adjusting a resolution of an application, based on training data approximating to target frames, in an electronic device according to various embodiments. The following description may describe detailed operations of operation 707 of adjusting the resolution of the application in FIG. 7.

Referring to FIG. 8, in operation 801, a processor (for example, the processor 120 of FIG. 1 or the processor 210 of FIG. 2) of the electronic device (for example, the electronic device 101 of FIG. 1 or the electronic device 200 of FIG. 2) may determine whether frames of training data exceed (e.g., are greater than) target frames based on frame information of training data approximating to the target frames. When the frames of the training data approximating to the target frames exceed the target frames, the processor may perform operations 803 and 805, and, when the frames of the training data do not exceed the target frames, the processor may perform operations 807 and 809.

When the frames of the training data approximating to the target frames exceed the target frames, the processor may increase a resolution of the training data by a designated ratio in operation 803. For example, the processor may increase a resolution value by 5% to make the frames of the training data correspond to the target frames. When the frames of the training data the resolution value of which increases are more than the target frames by a predetermined value or more, the processor may repeat the operation of increasing the resolution value of the training data to make a difference between the increased frames of the training data and the target frames smaller than the predetermined value. According to an embodiment, the designated ratio may be changed (or set) to various values by a user input. According to an embodiment, when it is impossible to increase the resolution of the training data (for example, when the resolution of the training data is a maximum resolution supported in the application, or a maximum resolution supported in the electronic device), the processor may not change the resolution of the training data approximating to the target frames and may maintain the resolution.

In operation 805, the processor may adjust the resolution of the application, based on the training data the resolution of which is increased. For example, the processor may change the resolution of the application to be the same as the resolution of the training data the resolution of which is increased. In this case, the resolution of the application is changed according to the training data the resolution of which is increased, such that the frames of the application are adjusted to match or approximate to the target frames.

When the frames of the training data do not exceed the target frames, the processor may reduce the resolution of the training data by a designated ratio in operation 807. For example, the processor may reduce a resolution value of the training data by 5%. The designated ratio may be changed (or set) to various values by a user input. When the frames of the training data the resolution value of which is reduced are smaller than the target frames by a predetermined value or more, the processor may repeat the operation of increasing the resolution value of the training data to make a difference between the increased frames of the training data and the target frames smaller than a predetermined value. According to an embodiment, when it is impossible to reduce the resolution of the training data (for example, when the resolution of the training data is a minimum resolution supported by the application, or the resolution of the application corresponds to a reference resolution (for example, a minimum resolution set by the user)), the processor may maintain the frames of the application more than or equal to the target frames by increasing the clock of the processor.

In operation 809, the processor may adjust the resolution of the application based on the training data the resolution of which is reduced. For example, the processor may change the resolution of the application to be the same as the resolution of the training data the resolution of which is reduced. In this case, the resolution of the application is changed according to the training data the resolution of which is reduced, such that the frames of the application are adjusted to match or to approximate to the target frames.

According to various embodiments, the processor may store pattern information regarding a pattern in which the training data is changed (for example, information regarding at least one of pattern information (or sequence information) of a pattern (or sequence) in which the resolution of the training data is increased, pattern information regarding a clock change of the processor, and target frame information), and may adjust (for example, increase or reduce) the resolution of the training data based on the stored pattern information. For example, in a state where training data shown in table 1 presented below is stored, when the resolution of the training data is adjusted in order of index 5→index 6→index 7, and then, the number of times the resolution of the training data is adjusted by index 8 is greater than or equal to a designated number of times, the processor may determine that there is a high possibility that index 8 is determined after index 5→index 6→index 7, and may store pattern information such as pattern information regarding a pattern in which the resolution of the training data is increased, pattern information regarding a clock change of the processor, and target frame information in the memory. Thereafter, when the resolution of the training data is adjusted in order of index 5→index 6→index 7, index 8 may be determined as a final resolution of the training data, based on the pattern information stored in the memory. According to an embodiment, the processor may adjust the resolution of the application based on the determined resolution of the training data, and then, when the number of times the frames of the application are different from the target frames by a predetermined value or more is greater than or equal to a designated number of times, the processor may additionally adjust the resolution of the training data not to make the frames of the application different from the target frames by the predetermined value or more, and then, may change the pattern information based on the resolution of the training data additionally adjusted.

TABLE 1

| Index | Resolution | FPS | Processor Clock (CPU level/GPU level) |
|---|---|---|---|
| 1 | 100% |  | CPU0, GPU1 |
| 2 | 100% | 48 | CPU0, GPU1 |
| 3 | 100% | 40 | CPU0, GPU0 |
| 4 | 100% | 38 | CPU0, GPU0 |
| 5 | 100% | 35 | CPU0, GPU0 |
| 6 | 95% | 43 | CPU0, GPU0 |
| 7 | 90% | 47 | CPU0, GPU0 |
| 8 | 85% | 50 | CPU0, GPU0 |

Figure 9:
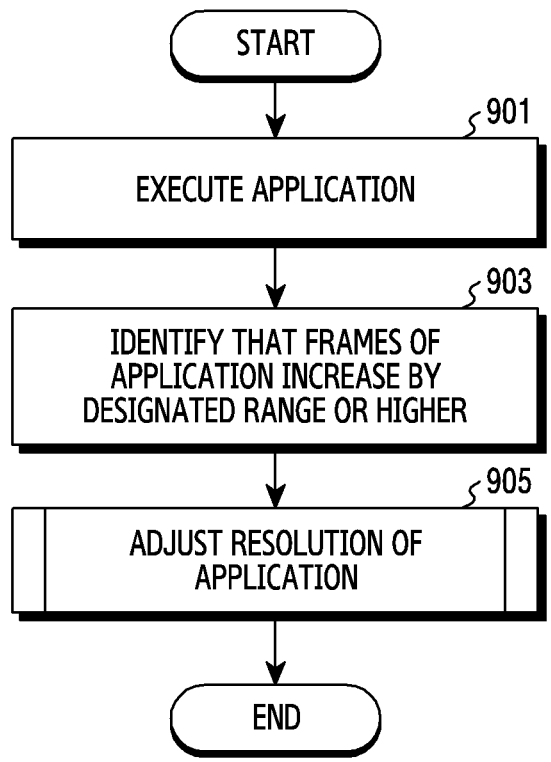
FIG. 9 is a flowchart illustrating another example method of adjusting a resolution of an application in an electronic device according to various embodiments.
Figure 10:
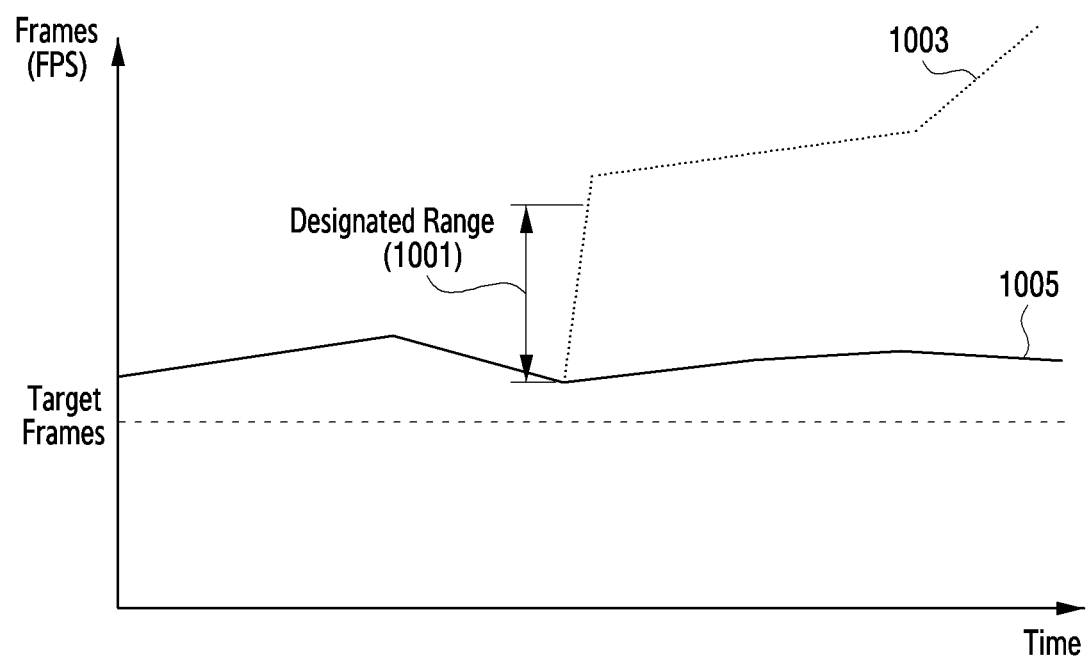
FIG. 10 is a graph illustrating another example of a change of frames of an application in an electronic device according to various embodiments.

FIG. 9 is a flowchart illustrating another example method of adjusting a resolution of an application in an electronic device according to various embodiments. FIG. 10 is a graph illustrating another example of a frame change of an application in an electronic device according to various embodiments.

Referring to FIGS. 9 and 10, in operation 901, a processor (for example, the processor 120 of FIG. 1 or the processor 210 of FIG. 2) of the electronic device (for example, the electronic device 101 of FIG. 1 or the electronic device 200 of FIG. 2) may execute an application. For example, the processor may control a display (for example, the display device 160 of FIG. 1 or the display 250 of FIG. 2) to display an execution screen of the application, based on a user input for executing the application. The application may include an application providing an image, such as a game application or a movie application.

In operation 903, the processor may identify that frames of the application increase by a designated range or higher while the application is executed. For example, the processor may monitor frames of the applications while the application is executed and may identify a frame change of the application, and may identify that the frames 1003 of the application increase from previous frames by a designated range 1001 or more as shown in FIG. 10. According to an embodiment, the designated range may be set to a different value according to an application. According to an embodiment, the designated range may be changed to another value based on a user input.

In operation 905, the processor may adjust a resolution of the application based on a resolution adjustment cost. For example, when the processor identifies that the frames 1003 of the application increase from the previous frames 1005 by the designated range 1001 or higher as shown in FIG. 10, the processor may identify an advantage cost (for example, an increase of user experience caused by an increase of the resolution) caused by the increase of the resolution, and a loss cost (for example, a current, heating, or battery consumption) caused by the increase of the resolution, and, when a sum of the advantage cost and the loss cost is less than a second threshold, the processor may maintain frames 1005 of the application within the designated range from the previous frames by adjusting the resolution of the application (for example, adjusting the resolution to a high resolution). According to an embodiment, when the sum of the advantage cost and the loss cost exceeds the second threshold, the processor may maintain the frames 1005 of the application within the designated range from the previous frames as shown in FIG. 10, by adjusting (for example, reducing) a clock of the processor.

According to various embodiments, the electronic device may maintain the frames of the application within a predetermined range by adjusting the resolution of the application and the clock of the processor, in order to prevent and/or reduce user experience of the application from being degraded due to the great increase of the frames of the application. Accordingly, the user experience of the application can be enhanced.

Figure 11:
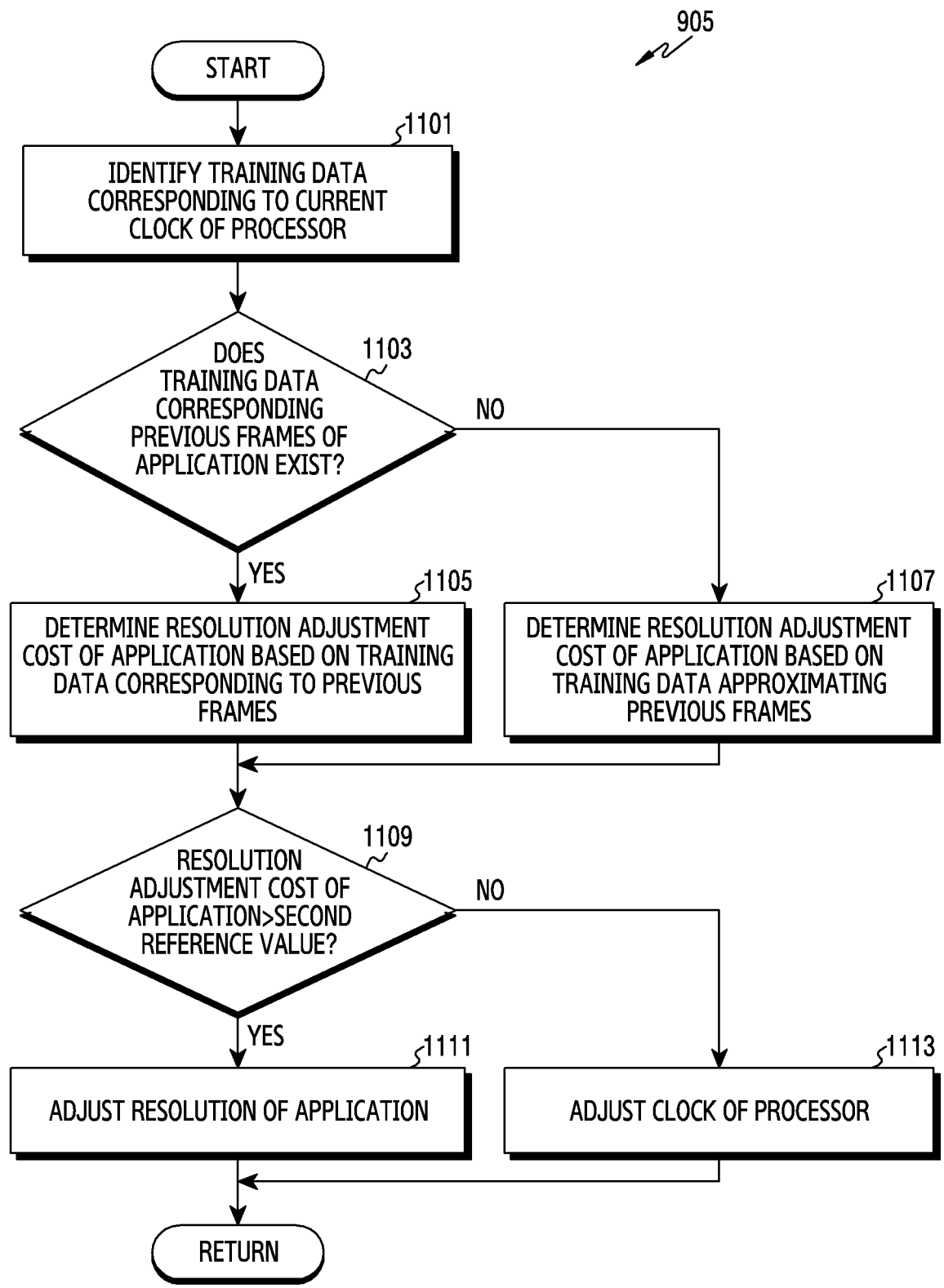
FIG. 11 is a flowchart illustrating another example method of adjusting a resolution of an application in an electronic device according to various embodiments.

FIG. 11 is a flowchart illustrating another example method of adjusting a resolution of an application in an electronic device according to various embodiments. The following description may describe detailed operations of operation 905 of adjusting the resolution of the application in FIG. 9.

Referring to FIG. 11, in operation 1101, a processor (for example, the processor 120 of FIG. 1 or the processor 210 of FIG. 2) of the electronic device (for example, the electronic device 101 of FIG. 1 or the electronic device 200 of FIG. 2) may identify training data including clock information corresponding to a current clock of the processor from a memory (for example, the memory 130 of FIG. 1 or the memory 220 of FIG. 2), in response to it being identified that frames of the application increase by a designated range or higher while the application is executed.

In operation 1103, the processor may determine whether training data corresponding to previous frames of the application from the training data corresponding to the current clock of the processor exists. For example, the processor may determine whether training data including the same frame information as the previous frames of the application in the training data corresponding to the current clock of the processor exists. When training data including the same frame information as the previous frames of the application exists, the processor may perform operation 1105, and, when the training data including the same frame information as the previous frames of the application does not exist, the processor may perform operation 1107.

When the training data corresponding to the previous frames of the application exists, the processor may determine a resolution adjustment cost of the application based on the training data corresponding to the previous frames of the application in operation 1105. The processor may determine an advantage cost caused by the increase of the resolution, by identifying a difference (or a ratio) between a resolution of the application when the training data corresponding the previous frames of the application is applied based on resolution information identified from the training data corresponding to the previous frames of the application, and a current resolution of the application. The processor may determine a loss cost caused by the increase of the resolution, by identifying a difference (or a ratio) between a clock of the processor when the training data corresponding to the previous frames of the application is applied based on clock information of the processor identified from the training data corresponding to the previous frames of the application, and a current clock of the processor. The processor may determine the resolution adjustment cost of the application by adding up the advantage cost caused by the increase of the resolution and the loss cost caused by the increase of the resolution.

When the training data corresponding to the previous frames of the application does not exist, the processor may determine the resolution adjustment cost of the application, based on training data approximating the previous frames of the application in operation 1107. The processor may determine an advantage cost caused by the increase of the resolution, by identifying a difference (or a ratio) between a resolution of the application when training data approximating to the previous frames of the application is applied based on resolution information identified from the training data approximating to the previous frames of the application, and a current resolution of the application. The processor may determine a loss cost caused by the increase of the resolution, by identifying a difference (or a ratio) between a clock of the processor when the training data approximating to the previous frames of the application is applied based on the clock information of the processor identified from the training data approximating to the previous frames of the application, and a current clock of the processor. The processor may determine the resolution adjustment cost of the application by adding up the advantage cost caused by the increase of the resolution and the loss cost caused by the increase of the resolution.

In operation 1109, the processor may determine whether the resolution adjustment cost of the application exceeds a second reference value. According to an embodiment, the second reference value may be set to a different value according to an application or may be set to the same value regardless of applications. According to an embodiment, the second reference value may be set or changed by a user input or information received from a server (for example, the server 104 of FIG. 1). When the resolution adjustment cost of the application exceeds the second reference value, the processor may perform operation 1111, and, when the resolution adjustment cost of the application is less than or equal to the second reference value, the processor may perform operation 1113.

When the resolution adjustment cost of the application exceeds the second reference value, the processor may adjust the resolution of the application, based on the training data corresponding to the previous frames of the application or the training data approximating to the previous frames of the application in operation 1111. For example, the processor may adjust (for example, increase) the resolution of the application based on resolution information of the training data including frame information which corresponds to (is the same as) the previous frames of the application. In another example, the processor may adjust a resolution of the training data based on a difference between frames of the training data approximating to the previous frames of the application, and the previous frames of the application, and may adjust the resolution of the application based on the training data the resolution of which is adjusted. According to an embodiment, when the frames of the training data exceed the previous frames of the application, the processor may increase the resolution of the training data by a designated ratio in order to match the frames of the training data with the previous frames of the application. According to an embodiment, when the frames of the training data are less than the previous frames of the application, the processor may reduce the resolution of the training data by a designated ratio in order to match the frames of the training data with the previous frames of the application. According to an embodiment, the processor may repeat the operation of changing the resolution of the training data to make the difference between the frames of the training data and the previous frames of the application smaller than a predetermined value.

When the resolution adjustment cost of the application is less than or equal to the second reference value, the processor may adjust the clock of the processor in operation 1113.

A method for controlling a display in an electronic device (for example, the electronic device 101 of FIG. 1 or the electronic device 200 of FIG. 2) according to various example embodiments may include: executing an application; detecting performance degradation of the application; and adjusting a resolution of the application based on a resolution adjustment cost of the application in response to the performance degradation of the application being detected.

According to various example embodiments, detecting the performance degradation of the application may include: monitoring frames (FPS) of the application while the application is executed; and detecting the performance degradation of the application based on a change in the frames of the application.

According to various example embodiments, detecting the performance degradation of the application may include: obtaining temperature information through a temperature sensor for measuring a temperature of at least a part of the electronic device while the application is executed; and detecting the performance degradation of the application based on the temperature information.

According to various example embodiments, adjusting the resolution of the application may include: identifying training data corresponding to a current clock of the processor; based on training data corresponding to target frames existing in the identified training data, determining the resolution adjustment cost of the application based on the training data corresponding to the target frames; and, based on the resolution adjustment cost of the application being less than or equal to a first reference value, adjusting the resolution of the application based on the training data corresponding to the target frames.

According to various example embodiments, adjusting the resolution of the application may include: based on the training data corresponding to the target frames not existing in the identified training data, determining the resolution adjustment cost of the application based on training data approximating the target frames; and, based on the resolution adjustment cost of the application being less than or equal to the first reference value, adjusting the resolution of the application based on the training data approximating the target frames.

According to various example embodiments, determining the resolution adjustment cost of the application may include: determining a penalty cost caused by reduction of the resolution based on a difference between a resolution of the training data and a current resolution of the application; determining a gain cost caused by the reduction of the resolution based on a difference between clock information of the processor of the training data and the current clock of the processor; and determining the resolution adjustment cost by adding up the penalty cost and the gain cost.

According to various example embodiments, the method for controlling the display in the electronic device may further include adjusting a clock of the processor to maintain the frames of the application to be greater than or equal to the target frames based on the resolution adjustment cost of the application exceeding the first reference value.

According to various example embodiments, the method for controlling the display in the electronic device may further include, based on identifying that the frames of the application increase from previous frames by a designated range or higher while the application is executed, adjusting the resolution of the application to make a difference between the frames of the application and the previous frames be within the designated range.

According to various example embodiments, adjusting the resolution of the application to make the difference between the frames of the application and the previous frames be within the designated range may include: based on training data corresponding to the previous frames existing in the identified training data, determining the resolution adjustment cost of the application based on the training data corresponding to the previous frames; and, based on the resolution adjustment cost of the application exceeding a second reference value, adjusting the resolution of the application based on the training data corresponding to the target frames.

According to various example embodiments, the method for controlling the display in the electronic device may further include, based on the resolution adjustment cost of the application being less than or equal to the second reference value, adjusting a clock of the processor to make a difference between the frames of the application and the previous frames be within the designated range.

The electronic device and the method according to various embodiments can maintain frames of an application within an appropriate range by adaptively changing a clock of the processor and/or a resolution of the application when the number of frames of the application is changed.

The electronic device and the method according to various embodiments can enhance user experience of an application by maintaining frames of the application within an appropriate range.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. One of ordinary skill in the art will understand that various changes in form and detail may be made without departing from the spirit and scope of the disclosure, including the appended claims and their equivalents.

What is claimed is:

1. An electronic device comprising:
a display;
a processor operatively connected with the display; and
a memory operatively connected with the processor,
wherein the memory is configured to store instructions that, when executed, cause the processor to:
execute an application,
detect performance degradation of the application,
determine a penalty cost caused by reduction of resolution based on a difference between a resolution of training data and a current resolution of the application,
determine a gain cost caused by the reduction of the resolution based on a difference between clock information of the processor of the training data and a current clock of the processor,
determine a resolution adjustment cost by adding the penalty cost and the gain cost, and
adjust the resolution of the application based on the resolution adjustment cost of the application,
wherein the training data is identified based on the current clock of the processor and target frames.

2. The electronic device of claim 1, wherein the instructions, when executed, cause the processor to monitor frames per second (FPS) of the application while the application is executed, and to detect the performance degradation of the application based on a change in the FPS of the application.

3. The electronic device of claim 1, further comprising a temperature sensor configured to measure a temperature of at least a part of the electronic device,
wherein the instructions, when executed, cause the processor to obtain temperature information through the temperature sensor while the application is executed, and to detect the performance degradation of the application based on the temperature information.

4. The electronic device of claim 1, wherein the instructions, when executed, cause the processor to:
identify the training data corresponding to the current clock of the processor;
based on the training data corresponding to the target frames existing in the identified training data, determine the resolution adjustment cost of the application based on the training data corresponding to the target frames; and
based on the resolution adjustment cost of the application being less than or equal to a first reference value, adjust the resolution of the application based on the training data corresponding to the target frames.

5. The electronic device of claim 4, wherein the instructions, when executed, cause the processor to:
based on the training data corresponding to the target frames not existing in the identified training data, determine the resolution adjustment cost of the application based on training data approximating the target frames; and
based on the resolution adjustment cost of the application being less than or equal to the first reference value, adjust the resolution of the application based on the training data approximating the target frames.

6. The electronic device of claim 5, wherein the instructions, when executed, cause the processor to adjust a clock of the processor to maintain the frames of the application to be greater than or equal to the target frames based on the resolution adjustment cost of the application exceeding the first reference value.

7. The electronic device of claim 1, wherein the instructions, when executed, cause the processor to, based on identifying that the frames of the application increase from previous frames by a designated range or higher while the application is executed, adjust the resolution of the application to make a difference between the frames of the application and the previous frames be within the designated range.

8. The electronic device of claim 7, wherein the instructions, when executed, cause the processor to:
based on the training data corresponding to the previous frames existing in the identified training data, determine the resolution adjustment cost of the application based on the training data corresponding to the previous frames; and
based on the resolution adjustment cost of the application exceeding a second reference value, adjust the resolution of the application based on the training data corresponding to the target frames.

9. The electronic device of claim 8, wherein the instructions, when executed, cause the processor to, based on the resolution adjustment cost of the application being less than or equal to the second reference value, adjust a clock of the processor to make a difference between the frames of the application and the previous frames be within the designated range.

10. The electronic device of claim 1,
wherein the penalty cost is determined based on reduction ratio of the resolution, and
wherein the gain cost is determined based on reduction ratio of at least one of a current, heating, or battery consumption caused by reduction of the clock of the processor.

11. A method for controlling a display in an electronic device, the method comprising:
executing an application;
detecting performance degradation of the application;
determining a penalty cost caused by reduction of resolution based on a difference between a resolution of training data and a current resolution of the application;
determining a gain cost caused by the reduction of the resolution based on a different between clock information of a processor of the training data and a current clock of the processor;
determining a resolution adjustment cost by adding the penalty cost and the gain cost; and
adjusting the resolution of the application based on the resolution adjustment cost of the application,
wherein the training data is identified based on the current clock of the processor and target frames.

12. The method of claim 11, wherein detecting the performance degradation of the application comprises:
monitoring frames per second (FPS) of the application while the application is executed; and
detecting the performance degradation of the application based on a change in the FPS of the application.

13. The method of claim 11, wherein detecting the performance degradation of the application comprises:
obtaining temperature information through a temperature sensor configured to measure a temperature of at least a part of the electronic device while the application is executed; and
detecting the performance degradation of the application based on the temperature information.

14. The method of claim 11, wherein adjusting the resolution of the application comprises:
identifying the training data corresponding to the current clock of the processor;
based on the training data corresponding to the target frames existing in the identified training data, determining the resolution adjustment cost of the application based on the training data corresponding to the target frames; and
based on the resolution adjustment cost of the application being less than or equal to a first reference value, adjusting the resolution of the application based on the training data corresponding to the target frames.

15. The method of claim 14, wherein adjusting the resolution of the application comprises:
based on the training data corresponding to the target frames not existing in the identified training data, determining the resolution adjustment cost of the application based on training data approximating the target frames; and
based on the resolution adjustment cost of the application being less than or equal to the first reference value, adjusting the resolution of the application based on the training data approximating the target frames.

16. The method of claim 15, further comprising adjusting a clock of the processor to maintain the frames of the application to be greater than or equal to the target frames based on the resolution adjustment cost of the application exceeding the first reference value.

17. The method of claim 11, further comprising, based on identifying that the frames of the application increase from previous frames by a designated range or higher while the application is executed, adjusting the resolution of the application to make a difference between the frames of the application and the previous frames be within the designated range.

18. The method of claim 17, wherein adjusting the resolution of the application to make the difference between the frames of the application and the previous frames be within the designated range comprises:
based on the training data corresponding to the previous frames existing in the identified training data, determining the resolution adjustment cost of the application based on the training data corresponding to the previous frames; and
based on the resolution adjustment cost of the application exceeding a second reference value, adjusting the resolution of the application based on the training data corresponding to the target frames.

19. The method of claim 18, further comprising, based on the resolution adjustment cost of the application being less than or equal to the second reference value, adjusting a clock of the processor to make a difference between the frames of the application and the previous frames be within the designated range.

20. The method of claim 11,
wherein the penalty cost is determined based on reduction ratio of the resolution, and
wherein the gain cost is determined based on reduction ratio of at least one of a current, heating, or battery consumption caused by reduction of the clock of the processor.

* * * * *